Oct. 18, 1960 E. F. WIEBOLDT 2,956,370
ORCHID CULTIVATION DEVICE AND METHOD OF CULTIVATING ORCHIDS
Filed May 28, 1959
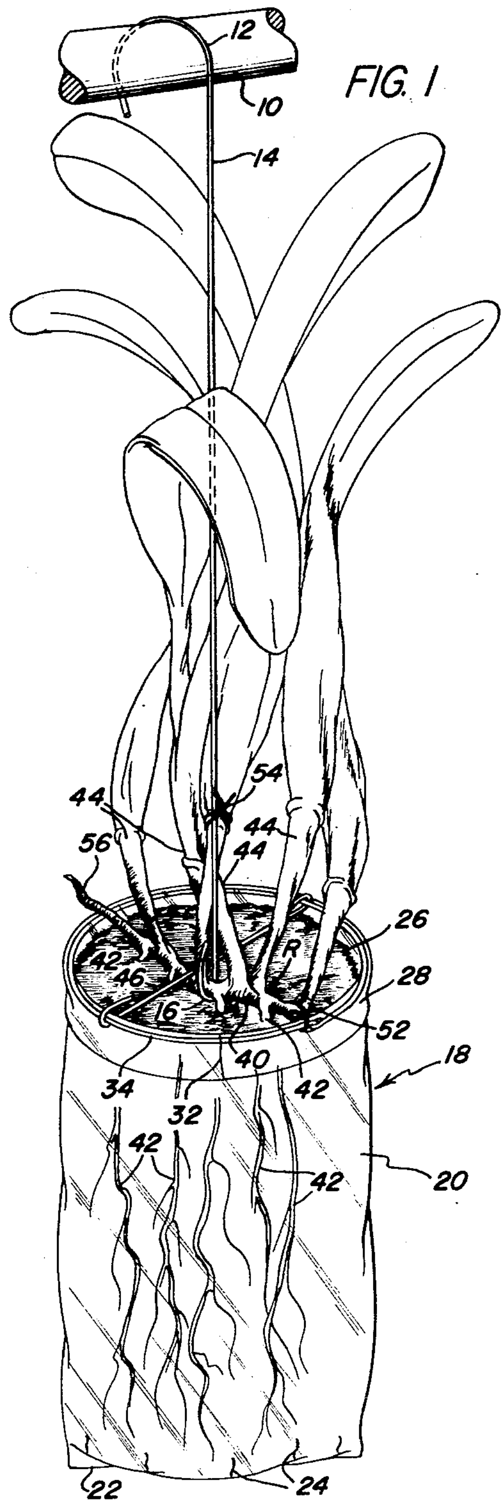
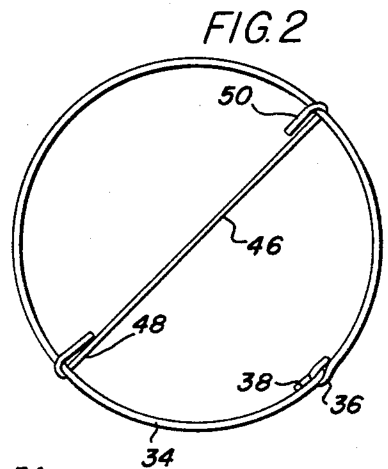
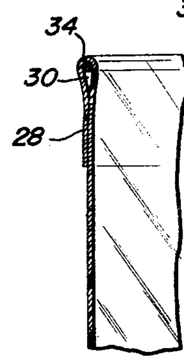
INVENTOR.
ELMER F. WIEBOLDT
BY
Samuel Meerkreebs
ATTORNEY 2,956,370

ORCHID CULTIVATION DEVICE AND METHOD OF CULTIVATING ORCHIDS

Elmer F. Wieboldt, Cove Creek Farm, North Garden, Va.

Filed May 28, 1959, Ser. No. 816,642

15 Claims. (Cl. 47—1.2)

This invention relates generally to horticulture and is more particularly concerned with the cultivation of epiphytic plants which have a rhizome that can be used to suspend the plant and support a plastic bag containing the root system in which the plant grows.

The ultimate aim of the horticulturist of epiphytic plants is to simulate the most natural growing conditions in which the plants will prosper. The epiphyte is one which grows upon other plants, although not parasitic, deriving the moisture for its development from the air. For example, an epiphytic plant such as the Cattleya orchid rhizome comprises an elongated rootlike stem of considerable length which sends up leafy shoots from its upper surface and emits roots from the lower side. This orchid, when growing wild, adheres to the bark of a tree, sending out its shoots and roots, the roots absorbing moisture from the air, and apparently receiving nourishment from leachings from the bark, bird droppings, etc.

Growers of epiphytic plants presently grow them in pots containing a suitable growing medium which is well drained. The present use of pots fails to simulate natural growing conditions where the roots are exposed and free to grow at will in the air with maximum drainage.

A primary object of the invention is to provide a novel method for the cultivation of epiphytic plants with suitable rhizomes, such as Cattleya orchids, for example.

A more particular object of the invention is to provide a novel method of growing such plants comprising filling a transparent drainable container with a suitable orchid growing medium, for example, suspending a piece of a Cattleya orchid rhizome by hooking a long hanger hook onto the rhizome with the other end of the hanger being engaged on a suitable support and suspending a drainable plastic bag containing a growing medium from the rhizome as will be apparent from the accompanying drawing.

A further object of the invention is to provide a novel container for cultivating orchids whereby orchids may be readily, expeditiously and economically cultivated.

And yet another object of the invention is to provide a novel container including a transparent louvered body portion having a bendable frame at its open end to permit shaping of the same and being suspendible from a growing rhizome.

More particular objects of the invention will become apparent from the reading of the following description of a preferred embodiment, the appended claims and the accompanying drawing, in which:

Figure 1 is a perspective view of one of the novel containers of the invention showing an orchid plant growing according to the novel method of the invention;

Figure 2 is a plan view of the container frame of the invention; and

Figure 3 is an enlarged fragmentary vertical section through a portion of the container.

Referring to the drawing in detail, a transversely disposed support rod or pole 10 has suspended thereon by means of a hook portion 12 an elongated hook 14 including a lower bendable hook portion 16.

Indicated generally at 18 is a container comprising a flexible sack or body portion 20 of a suitable transparent material, such as polyethylene. The orchid rhizome may grow a considerable length and the bag diameter will be suitable to accommodate the same for a proper length of time. The lower end of the bag 20 is sealed at 22 and includes a plurality of slits or louvers 24 to insure positive drainage of the growing medium 26 which may comprise a bark and charcoal mixture, for example.

The upper end of the bag 20 includes a turned over, heat sealed edge 28 forming a peripheral sleeve 30 open at 32 into which is threaded a bendable wire frame 34 having connected eye portions 36 and 38 at its terminal ends or other suitable fastening means. The bag opening may be shaped to be suitable for the plant at the time of "potting" and within a reasonable time thereafter before a root structure has been formed.

An orchid rhizome is indicated generally at R and includes an elongated body portion 40, which grows from right to left as viewed in Figure 1. The rhizome includes depending roots 42 and upwardly growing shoots 44. The bendable hook portion 16 of the hook 14 is bent beneath the rhizome as seen in Figure 1. A transverse wire 46 is hooked at opposite ends 48 and 50 diametrically of the frame 34, the wire passing transversely over the rhizome, it being understood that additional wires may be used if necessary. The rear end of the rhizome is anchored at its rear shoot by a wire 52 to insure its growing from right to left and one or more plant ties such as 54 are utilized to tie a shoot to the upstanding hook 14 to shape the plant growth.

When the orchid grows in the manner illustrated in Figure 1, the roots readily penetrate the growing medium, most of the roots receiving natural light through the transparent bag 20 after the plant has become established. The louvered bottom portion insures the necessary drainage of the growing medium and the bag, being a relatively impermeable material, will retain moisture about the roots of the plant to promote natural growing. When the rhizome has grown out of the container in which it was planted, i.e. it extends over the edge in the direction in which it is growing, a new plant can be started by suspending a second container, such as that disclosed beneath the end 56 of the rhizome, and after the roots become established in the growing medium in the second bag, the rhizome may be severed between the two containers and thus a new plant is started.

The novel method of "suspended growing" of such epiphytic plants comes closer to simulating natural growing conditions, allowing the chlorophyl of the roots to function in its proper atmosphere which is not possible when utilizing clay pots and the like.

The construction shown and the method described embodies the invention in its preferred form, however, it is intended that the foregoing disclosure be illustrative rather than definitive, the invention being defined in the appended claims.

What is claimed as new is as follows:

1. A container for cultivating epiphytic plants such as orchids and the like having a tough rhizome, comprising a transparent body portion including a closed bottom, drainage means in said closed bottom insuring drainage of a growing medium in the container, and support means on said body portion for suspending said container from the rhizome of an epiphytic plant.

2. The structure of claim 1 in which said container comprises a flexible, impervious sack, said support means comprising a bendable frame retaining the sack in an open condition, and suspension means for hanging said container from the rhizome.

3. The structure of claim 2 in which said suspension means comprises an elongated hook terminal portion which suspends the plant and comprises a tie stake for the mature and growing shoots of the plant.

4. The structure of claim 2, said support means including an element extending transversely of said open top of the sack for receipt transversely above the rhizome from which the container is suspended.

5. The structure of claim 4 including retaining means secured to said frame for anchoring the rhizome at the end from which the rhizome grows.

6. The structure of claim 2 in which said frame comprises a bendable wire permitting the open top of the container to be shaped along the rhizome of the growing plant.

7. The method of cultivating orchids comprising disposing a rhizome in overlying relation to a cultivating medium in a light permeable and drainable container, anchoring said rhizome to said container, and suspending said rhizome with said container supported by said rhizome.

8. The method of claim 7 including anchoring said rhizome to said container at the end thereof opposite that from which the rhizome grows.

9. The method of claim 7 including shaping said container to conform to the shape of said rhizome.

10. The method of claim 7 including the step of utilizing a growing medium comprising charcoal and bark.

11. The method of claim 7 comprising the step of forming said container from a flexible, transparent plastic material.

12. The method of claim 7 including the step of providing said container with a bendable frame and shaping it to conform to the shape of the orchid rhizome.

13. The method of claim 7 including the step of tying vertical shoots of the rhizome to the means by which the rhizome is suspended.

14. The method of claim 7 including the step of securing a second light, permeable container to said first mentioned container in the direction toward which said rhizome is growing whereby both containers are suspended from said rhizome.

15. The method of cultivating epiphytic plants comprising disposing a rhizome in overlying relation to the surface of a cultivating medium in a light permeable and drainable container down into which the roots of the rhizome will grow, anchoring said rhizome at one end to said container, and suspending said rhizome with said container suspended from said rhizome.

References Cited in the file of this patent

UNITED STATES PATENTS

| | | |
|---|---|---|
| 383,327 | Starr | May 22, 1888 |
| 844,636 | Vanderbilt | Feb. 19, 1907 |
| 1,665,724 | Way | Apr. 10, 1928 |
| 2,344,076 | Bonfiglioli | Mar. 14, 1944 |

FOREIGN PATENTS

| | | |
|---|---|---|
| 741,567 | France | Dec. 12, 1932 |
| 405,723 | Great Britain | Feb. 15, 1934 |

OTHER REFERENCES

"Gardener's Assistant" (Thompson), published by Blackie and Son (London), 1878, pages 513 and 900 relied on.

"Standard Cyclopedia of Horticulture" (Bailey), published by MacMillan (N.Y.), 1943, volume 2, pages 2393, 2394, 2395.